Feb. 6, 1940. J. W. LEIGHTON 2,188,910
INDEPENDENT SPRINGING
Filed June 2, 1939
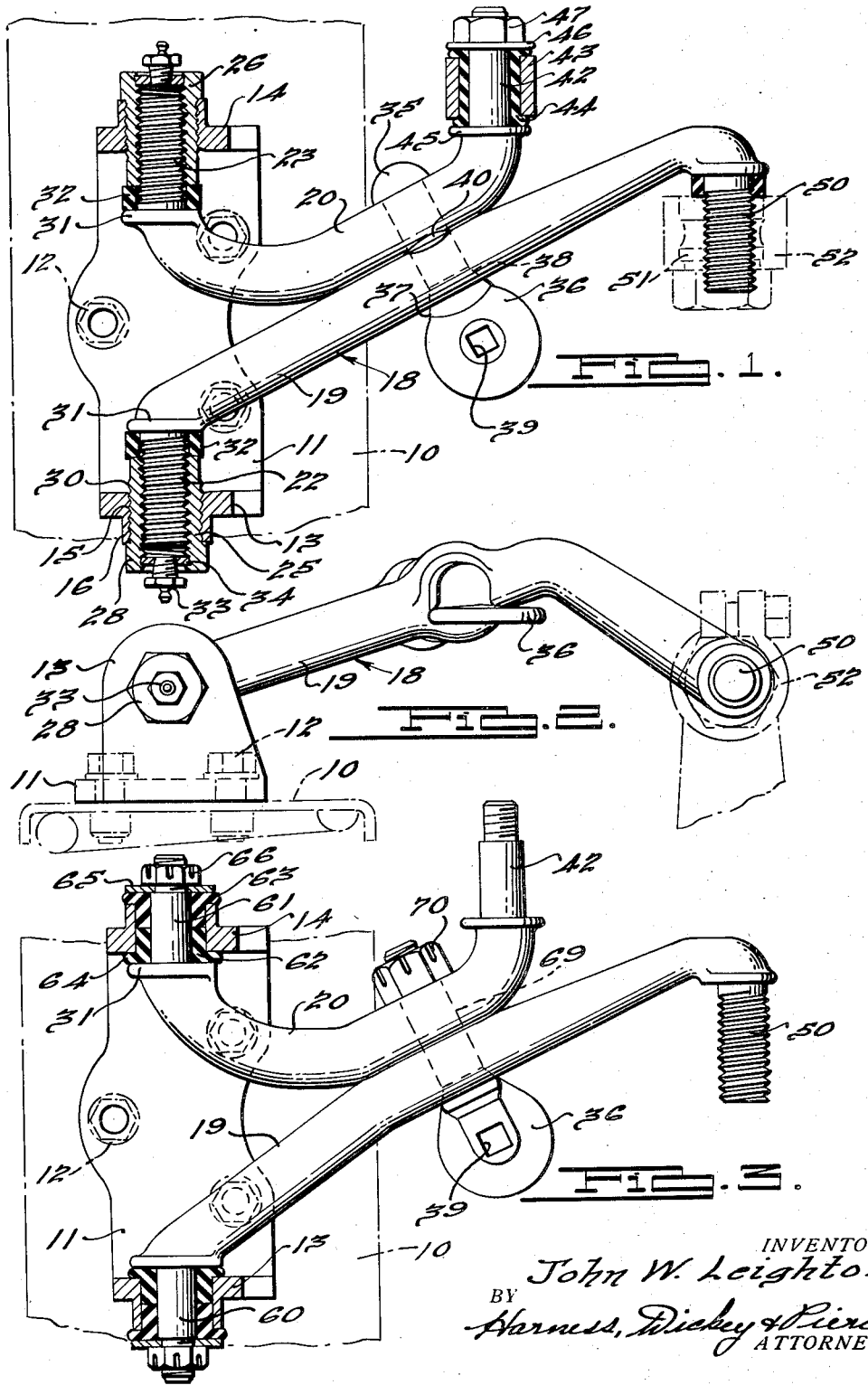
INVENTOR
John W. Leighton
BY
Harness, Dickey & Pierce
ATTORNEYS.

Patented Feb. 6, 1940

2,188,910

UNITED STATES PATENT OFFICE 2,188,910

INDEPENDENT SPRINGING

John W. Leighton, Port Huron, Mich.

Application June 2, 1939, Serial No. 277,095

7 Claims. (Cl. 267—20)

The invention relates to automobiles and it has particular relation to individual wheel suspensions.

In certain respects, the invention is related to that disclosed and claimed in my copending application for patent, Serial No. 106,340, filed October 19, 1936.

As will be understood in the art at the present time, wheels in individual suspensions are pivotally linked to the vehicle frame by means of upper and lower arms, each of which is pivotally connected to the frame and to the wheel support. It is known also at the present time, as evidenced for example by the copending application identified above, that an efficient assembly may be provided by connecting the shock absorber to the upper arm or link. As further indicated by such copending application for patent, threaded bearings are employed in the pivotal connections.

One object of the present invention is to provide an improved arm or linkage for connecting the wheel support to the vehicle frame, which can be manufactured even less expensively than arms devised heretofore, to the end that the cost of these suspensions and hence the cost of the automobile will be still further reduced.

Another object of the invention is to provide an improved arm structure which obtains increased resiliency to an extent considered desirable for absorbing shocks transmitted laterally of the vehicle frame.

Another object of the invention is to provide an improved means for connecting two bar elements, constituting one of the linkages, wherein such connection serves additionally as an abutment for engaging a lifting jack.

Other objects of the invention will become apparent from the following specification, from the drawing to which it relates, and from the claims hereinafter set forth.

For a better understanding of the invention, reference may be had to the drawing, wherein:

Figure 1 is a plan view partly in cross-section of the upper arm of an individual suspension constructed according to one form of the invention;

Fig. 2 is a side elevational view of the structure shown by Fig. 1; and

Fig. 3 is a plan view similar to that shown by Fig. 1, illustrating an upper arm as constructed according to another form of the invention.

Referring to Figures 1 and 2, an automobile longitudinal frame member is indicated at 10 and on the upper side of this frame member, a bracket 11 is secured by bolts 12. This bracket is stamped from sheet metal, and includes upstanding end flanges 13 and 14. Each of these flanges has an aperture 15 and the length of this aperture is increased by drawing of the metal outwardly, as indicated at 16.

For pivotally connecting a wheel support to the frame, an arm is provided, and this arm includes bar elements 19 and 20 formed from round metal stock. Such bar elements, respectively, have offset inner ends 22 and 23, which are threaded and arranged in axial alignment one with the other. These threaded offset ends respectively are received within the apertures in the flanges 13 and 14 of bracket 11 and it will be observed that each threaded offset end is substantially smaller than the diameter of the apertures.

For the purpose of pivotally receiving the offset ends 22 and 23, internally threaded bushings 25 and 26 are threaded into the apertures 15 and these bushings, respectively, receive the threaded offset ends 22 and 23. Each bushing has a head 28 and shallow external thread 30 that fits a similar shallow thread in the aperture, and by tightening the bushing and drawing the head 28 against the extension 16, the external, shallow thread is frictionally locked to the shallow thread in the aperture. The threaded engagement between the internal threads in the bushings and the external threads on the offset ends of the bar elements is such as to allow free pivotal movement and, accordingly, the bushings will remain stationary upon oscillatory movement of the arm.

At the inner end of each of the offset threaded ends of the bar elements, the metal is upset to provide a collar 31, and between this collar and the adjacent end of the bushing, a rubber sealing element 32 is fitted around the threaded end, so as to prevent dirt from entering the threaded bearing and to prevent lubricant from escaping. Lubricant is injected into the bearing through a grease fitting 33 extending through a Welch plug 34, closing the outer end of the bushing.

The bar elements 19 and 20 have their intermediate portions directed obliquely to the offset ends 22 and 23 and are rigidly connected at an intermediate point by means of a rivet pin 35 that is provided at one end with a flat, disc-like step 36 and an irregularly shaped head 37 which fits a corresponding aperture 38 in bar 19 so as to lock the rivet against turning. The step is adapted to engage a lifting jack and an opening 39 in the step is adapted to receive a part of the jack. Additionally, the two bar elements may be welded together along their top sides immediately over the rivet, as indicated at 40.

At this time it may be noted that the inner ends of the bar elements, including the threaded shanks 22 and 23, are so arranged with respect to the upstanding flanges 13 and 14 that an assembly of the various parts may be made even though the bar elements initially are connected in the manner described. With the parts initially disassembled and with the bushings removed from the apertures, the unitary arm may be angled at first in order to allow insertion of the threaded stem 22, for example, into the corresponding aperture in the flange 13, and it will be understood that this angling of the arm to allow the initial insertion is permitted by the larger size of the opening. Then, by moving the assembly until the collar 31 is close to the flange 13, the outer end of stem 23 may be positioned so that it may be moved past the inner side of the flange 14 and to a position of alignment with the opening in the latter flange. Then with both stems in alignment with the openings and with stem 22 in the opening in flange 13, the arm may be moved reversely to position the stems in about the location shown. Then, the bushings 25 and 26 may be threaded into the openings and simultaneously on to the threaded stems. The rubber washers 32 may be placed on the stems before the arm is associated with the bracket and the parts are so arranged that enough room is provided to allow the installation even though the rubber washers are initially in place. In threading the bushings into the apertures, the shallow threads in the latter may be formed automatically when the bushings are threaded thereinto, or such shallow threads may be preformed in the openings, as may be found most desirable at the time.

The outer end of bar element 20 is offset to provide a shock absorber stem 42 and ordinarily the shock absorber will have an eye portion 43 receiving the trunnion and a rubber bushing 44 will be inserted within the eye and around the trunnion. This bushing and the eye are retained between an upset collar 45 on the stem 42 and a washer 46 which in turn abuts a retaining nut 47.

At its outer end, the bar element 19 has an offset threaded end substantially like the inner threaded offset end 22, and this outer offset threaded end, as shown, is threaded into an eccentric bushing 51 located in a wheel supporting member 52. It will be noted that the outer end of the bar element 19 is downwardly bent or deflected at a rather sharp angle, and this is desirable so as to provide resiliency and especially lateral resiliency for cushing the shocks in this direction. In addition, the cantilever projection, characterizing the outer end of the bar 19, provides for vertical and longitudinal resiliency.

The arm shown by Fig. 3 is like that shown by Fig. 1 with the exception that plain cylindrical stems 60 and 61 are provided at the inner ends of the bar elements 19 and 20 and each of these receives rubber bushing elements 62 and 63. These rubber bushings are held on the stem by the upset flange 31 and by an outer washer 65 located on the reduced threaded end of stem. A nut on such threaded end holds the washer against the shoulder at the inner end of such threaded portion and it is to be understood that with the washer so located, the rubber is under sufficient pressure to maintain its form shown.

In this construction, as a further distinction from that shown in Fig. 1, the arms are connected intermediate their ends by a bolt 69, which is provided with a head and step at one end, as previously described, and a releasable nut 70 on its other end. In this case, the bar elements are separately associated with the flanges of the bracket and then are connected by means of the bolt as the parts are not so arranged that the bars can first be connected and then their ends inserted into the apertures.

In manufacturing arms such as described, bar-like elements are fashioned from round bar stock, which is initially straight. The ends of the bar are heated, then bent, then the bent ends are axially upset in order to form the integral shoulders shown, and then the threads are formed on such ends. A copending case, Serial No. 277,096, filed June 2, 1939, discloses and claims particularly the method of forming the bar-like elements from round bar stock.

The shape of the bars and the manner in which they are connected together enables manufacture of the arm in the most economical way, while still providing for proper pivotal connection with the frame and wheel support and also for pivotal connection with the shock absorber. The simplicity of the construction is of considerable importance because of the related reduction in manufacturing costs.

Although more than one form of the invention has been described and illustrated in detail, it will be apparent to those skilled in the art that various modifications may be made without departing from the scope of the appended claims.

What is claimed is:

1. In an individual suspension, an arm for pivotally linking a wheel support to the vehicle frame and comprising a pair of U shape bars having their base portions in back to back abutting relation so as to have the legs on one bar projecting oppositely to the legs on the other bar, each of said legs being formed to provide a journal or trunnion, and means for connecting the base portions of the bars.

2. In an individual suspension, an arm for pivotally linking a wheel support to the vehicle frame and comprising a pair of U shape bars having their base portions directed obliquely to the leg portions and located in back to back abutting relation, and means connecting the base portions to provide a unitary arm.

3. In an individual suspension, an arm for pivotally linking a wheel support to the vehicle frame and comprising a pair of U shape bars having their base portions in back to back abutting relation so as to have the legs on one bar projecting oppositely to the legs on the other bar, each of said legs being formed to provide a journal or trunnion, and means for connecting the base portions of the bars and comprising a pin passing through the base portions and having one of its ends upset to provide an enlarged disclike head adapted for engagement with a lifting jack.

4. In an individual suspension, an arm for pivotally linking a wheel support to the vehicle frame and comprising a pair of U shape bars having their base portions directed obliquely to the leg portions and located in back to back abutting relation, and means connecting the base portions to provide a unitary arm and comprising a pin projecting through both base portions and having one of its ends upset to provide an enlarged disclike head adapted for engagement with a lifting jack.

5. In an individual suspension, an arm for pivotally linking a wheel support to a vehicle frame, comprising a first bar element having its ends offset to provide parallel bearing trunnions, respectively, a second bar having offset trunnions at its ends, one of which is aligned axially with the trunnion at one end of the first bar, said bars having substantial intermediate linear portions directed obliquely to the offset ends, and means connecting said obliquely directed portions of the bars, the first bar between the connection and its other end being bent substantially with respect to the remainder of the bar in a direction transversely of the trunnion axis.

6. In combination in an individual suspension, a bracket adapted to be fastened to a vehicle frame and having upstanding, spaced flanges provided with aligned apertures, an arm adapted to be connected at one end to a wheel support and having diverging portions at its other end terminating in oppositely projecting bent or offset bearing trunnions which are aligned and which respectively project into the apertures, said apertures being enlarged relative to the bearing trunnions and each of the bends in the arm portions being substantially spaced axially from the adjacent end of the aperture in which its bearing trunnion is disposed, the spacing and difference in diameters of the apertures and bearing trunnions and the length of the latter being such as to allow initial diagonal insertion of one trunnion into its aperture until the other trunnion can be swung past the other flange and into alignment with its aperture and then movement of the arm axially of the apertures to locate both trunnions in both apertures, and a bushing disposed in each aperture and receiving the trunnion end therein, said bushings being adapted for insertion after the trunnions are positioned in the apertures.

7. In an individual suspension, an arm pivotally linking a wheel support to a vehicle frame, comprising a first bar element having its ends offset to provide inner and outer bearing trunnions respectively, a second bar having offset trunnions at its ends, one of which is aligned axially with the trunnion at one end of the first bar, said bars having substantial intermediate linear portions directed obliquely to the axially aligned trunnions, and means connecting said obliquely directed portions of the bars, the first bar between the connection and its other end being bent substantially with respect to the remainder of the bar in a direction transversely of the trunnion axis.

JOHN W. LEIGHTON.